US010348115B2

(12) United States Patent
Ouyang

(10) Patent No.: US 10,348,115 B2
(45) Date of Patent: Jul. 9, 2019

(54) POWER SUPPLY CIRCUIT FOR COMPUTING PLATFORM

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 11 days.

(21) Appl. No.: 15/873,754

(22) Filed: Jan. 17, 2018

(65) Prior Publication Data

US 2018/0212436 A1 Jul. 26, 2018

(30) Foreign Application Priority Data

Jan. 24, 2017 (CN) .......................... 2017 1 0059338

(51) Int. Cl.
*H02J 7/00* (2006.01)
*H02M 1/00* (2006.01)
*H02M 3/158* (2006.01)

(52) U.S. Cl.
CPC ............ *H02J 7/007* (2013.01); *H02J 7/0004* (2013.01); *H02J 7/0021* (2013.01); *H02J 7/0047* (2013.01); *H02J 7/0052* (2013.01); *H02J 7/0068* (2013.01); *H02J 2007/0096* (2013.01); *H02M 3/1582* (2013.01); *H02M 3/1584* (2013.01); *H02M 2001/0022* (2013.01)

(58) Field of Classification Search
CPC .................................................... H02M 3/158
See application file for complete search history.

(56) References Cited

U.S. PATENT DOCUMENTS

| | | | | |
|---|---|---|---|---|
| 8,773,090 B2 | | 7/2014 | Ouyang | |
| 9,270,178 B2 | | 2/2016 | Jiang | |
| 2007/0188134 A1* | | 8/2007 | Hussain ................ | H01M 10/44 320/114 |
| 2014/0203762 A1* | | 7/2014 | Kato ..................... | H02J 7/0031 320/107 |
| 2016/0226264 A1 | | 8/2016 | Xu | |
| 2016/0315535 A1 | | 10/2016 | Ouyang | |

* cited by examiner

*Primary Examiner* — Jue Zhang
*Assistant Examiner* — Trinh Q Dang
(74) *Attorney, Agent, or Firm* — Perkins Coie LLP

(57) ABSTRACT

A system has a processor, a battery charging circuit, a voltage regulating circuit and a control circuit. The control circuit provides digitalized feedback signals representative of circuit parameters of the battery charging circuit and circuit parameters of the voltage regulating circuit to the processor and receives a first information and a second information from the processor. The processor is able to adjust its operating states in response to the digitalized feedback signals. The control circuit controls the battery charging circuit in response to the circuit parameters of the battery charging circuit and the first information received from the processor, and the control circuit controls the voltage regulating circuit in response to the circuit parameters of the voltage regulating circuit and the second information received from the processor.

19 Claims, 8 Drawing Sheets

POWER SUPPLY CIRCUIT FOR COMPUTING PLATFORM

CROSS-REFERENCE TO RELATED APPLICATION

This application claims the benefit of CN application No. 201710059338.8, filed on Jan. 24, 2017, and incorporated herein by reference.

TECHNICAL FIELD

The present invention relates to electrical circuit, more particularly but not exclusively relates to power supply circuit.

BACKGROUND

With development of the electronic technical, a computing system is widely used in electronic devices. For example, from handheld electronic equipments (e.g., tablet personal computer, e-book, digital camera, and so on), to large electronic equipments (e.g., server, computing base station, and so on), all require the computing system. A computing platform comprises a central processing unit (CPU) and other components. The CPU is utilized to interpret machine readable instructions and process all data in the computing system. A voltage regulator is also needed to power the CPU.

As user requirements increasing, the CPU needs to boost its performance at times, e.g., increasing an operating frequency of the CPU. However, instantaneous power needed by the CPU would increase dramatically to support the boosted performance. Thus, a power supply circuit dedicated to the computing platform is needed.

SUMMARY

It is one of the objects of the present invention to provide system, power supply circuit and associated control method.

One embodiment of the present invention discloses a system, comprising: a processor; a battery charging circuit, having an input terminal configured to receive an input voltage from a power source and an output terminal coupled to a battery, wherein when the input terminal connects to the power source, the battery charging circuit is configured to provide a system voltage and a system current at the output terminal and provide a charging current to charge the battery; a voltage regulating circuit, configured to receive the system voltage and provide a processor voltage to the processor; and a control circuit, configured to interchange information with the processor through a communication bus, the control circuit is further configured to provide a first control signal to control the battery charging circuit based on circuit parameters of the battery charging circuit and a first information received from the processor, and the control circuit is configured to provide a second control signal to control the voltage regulating circuit based on circuit parameters of the voltage regulating circuit and a second information received from the processor.

Another embodiment of the present invention discloses a power supply circuit, comprising: a battery charging circuit, having an input terminal configured to receive an input voltage from a power source, and an output terminal coupled to a battery, wherein when the input terminal connects to the power source, the battery charging circuit is configured to provide a system voltage and a system current at the output terminal and provide a charging current to charge the battery; a voltage regulating circuit, coupled to the output terminal of the battery charging circuit to receive the system voltage, and configured to provide a processor voltage to a processor; and a control circuit, configured to provide a first control signal to control the battery charging circuit based on circuit parameters of the battery charging circuit, and provide a second control signal to control the voltage regulating circuit based on circuit parameters of the voltage regulating circuit, and the control circuit is configured to interchange information with the processor through a communication bus; wherein the control circuit is configured to provide digitalized feedback signals representative of the circuit parameters of the battery charging circuit and the circuit parameters of the voltage regulating circuit to the processor, and the processor is able to adjust its operating states accordingly.

Yet another embodiment of the present invention discloses a control method for a power supply circuit, the power supply circuit comprising a battery charging circuit having an input terminal configured to receive an input voltage, an output terminal configured to provide a system voltage and a system current, and a voltage regulating circuit configured to receive the system voltage and provide a processor voltage to a processor, wherein the battery charging circuit is further configured to charge a battery with a charging current, the control method comprising: sensing circuit parameters of the battery charging circuit and circuit parameters of the voltage regulating circuit, and providing digitalized feedback signals accordingly via analog to digital converting; sending the digitalized feedback signals to the processor, and the processor is able to adjust its operating states in response to the digitalized feedback signals; receiving a plurality of information from the processor through a communication bus; controlling the battery charging circuit in response to the circuit parameters of the battery charging circuit, and in response to at least part of the plurality of information received from the processor; and controlling the voltage regulating circuit in response to the circuit parameters of the voltage regulating circuit, and in response to at least part of the plurality of the information received from the processor.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to a system having a processor, a power supply circuit and associated control method. The power supply circuit comprises a battery, a battery charging circuit, a voltage regulating circuit, and a control circuit for controlling the battery charging circuit and the voltage regulating circuit. The control circuit provides digitalized feedback signals based on circuit parameters of the battery charging circuit and circuit parameters of the voltage regulating circuit to the processor, and receives information from the processor. The processor is able to adjust its operating states in response to the digitalized feedback signals. Thus, it is possible to effectively utilize power, the power supply circuit would meet demands of the processor without increasing volume or PCB (printed circuit board) size, and stability of the system is improved.

Figure 1:
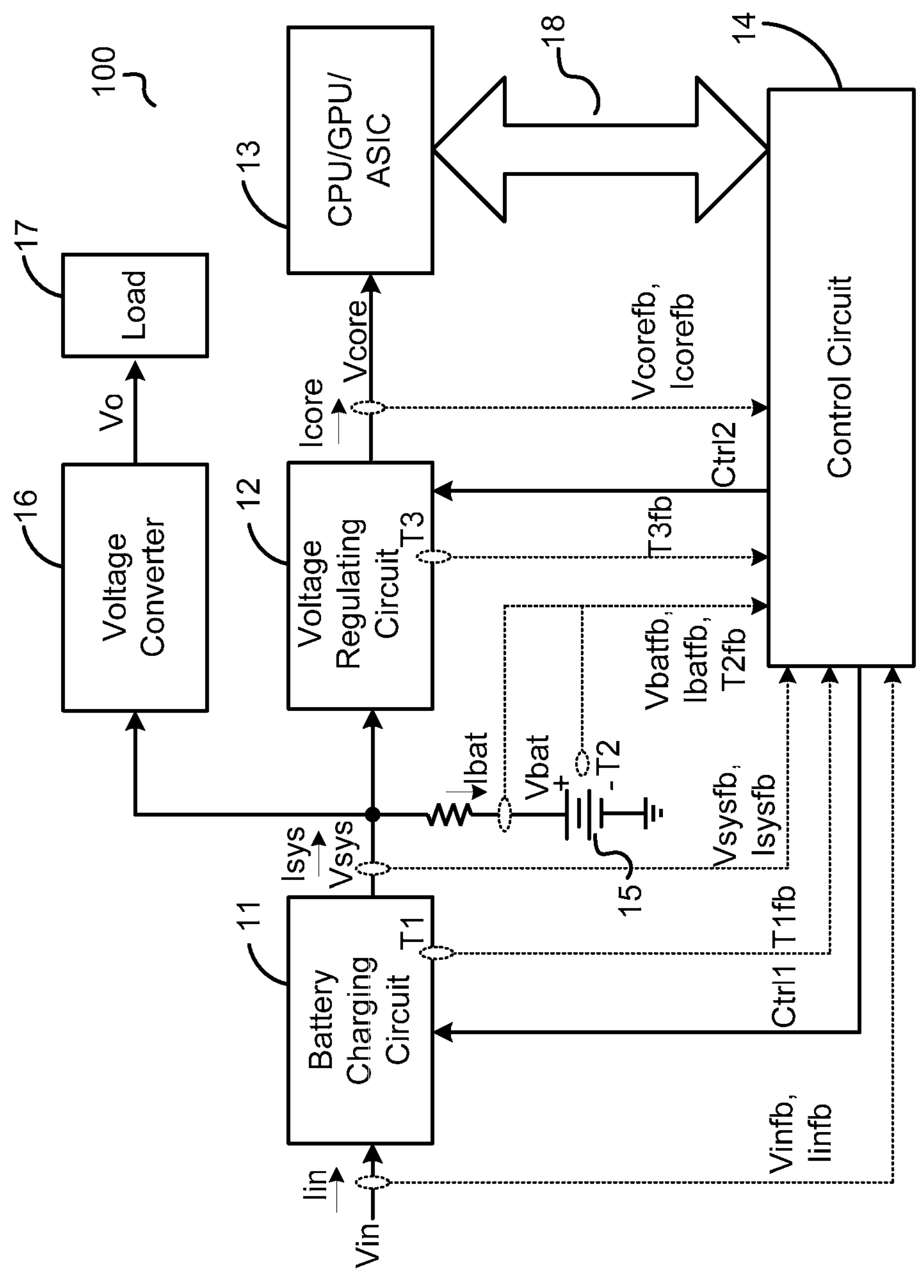
FIG. 1 illustrates a circuit block diagram of a system 100 according to an embodiment of the present invention.

FIG. 1 illustrates a circuit block diagram of a system 100 according to an embodiment of the present invention. System 100 comprises a battery charging circuit 11, a voltage regulating circuit 12, a processor 13, and a control circuit 14. Processor 13 may be a CPU, a graphics processing unit (GPU), or an application specific integrated circuit (ASIC). In one embodiment, system 100 is part of a computing platform, and the power supply circuit utilized to power the computing platform comprises battery charging circuit 11, a battery 15, voltage regulating circuit 12, and control circuit 14. One or both of battery charging circuit 11 and battery 15 provides a system voltage Vsys, and voltage regulating circuit 12 receives system voltage Vsys and provides a processor voltage Vcore and a processor current Icore to processor 13. Battery charging circuit 11 has at least one switch, and voltage regulating circuit 12 has at least one switch too. In one embodiment, system 100 further comprises a voltage converter 16 which converts system voltage Vsys to an output voltage Vo for powering a load 17. Load 17 may comprise some other equipments of the computing platform, such as a memory, a graphics card, and a network card. Voltage converter 16 may comprise a direct-current (DC) voltage converter. When battery charging circuit 11 connects to a power source, e.g., an adapter, an alternating-current (AC) source or a DC source, system voltage Vsys is provided by battery charging circuit 11, and battery 15 is charged by battery charging circuit 11 via a charging current Ibat. When battery charging circuit 11 disconnects from the power source, an input voltage Vin battery charging circuit 11 received is zero volt, an input current Iin flowing into battery charging circuit 11 is zero amp, and system voltage Vsys is provided by battery 15.

Control circuit 14 receives a first plurality of feedback signals representative of circuit parameters of battery charging circuit 11, and provides at least a control signal Ctrl1 to control battery charging circuit 11 (e.g., control the at least one switch of battery charging circuit 11) based on the first plurality of feedback signals. The first plurality of feedback signals may comprise one or more of an input voltage feedback signal Vinfb representative of input voltage Vin, an input current feedback signal Iinfb representative of input current Iin, a system voltage feedback signal Vsysfb representative of system voltage Vsys, a system current feedback signal Isysfb representative of a system current Isys which is a total current the battery charging circuit 11 provided, a battery voltage feedback signal Vbatfb representative of a battery voltage Vbat, a charging current feedback signal Ibatfb representative of charging current Ibat, a temperature feedback signal T1_fb_ representative of a temperature T1 of battery charging circuit 11, and a temperature feedback signal T2_fb_ representative of a temperature T2 of battery 15. Control circuit 14 further receives a second plurality of feedback signals representative of circuit parameters of voltage regulating circuit 12, and provides at least a control signal Ctrl2 to control voltage regulating circuit 12 (e.g., control the at least one switch of voltage regulating circuit 12) based on the second plurality of feedback signals. The second plurality of feedback signals may comprise one or more of a processor voltage feedback signal Vcorefb representative of processor voltage Vcore, a processor current feedback signal Icorefb representative of processor current Icore, and a temperature feedback signal T3_fb_ representative of a temperature T3 of voltage regulating circuit 12. Control circuit 14 is coupled to processor 13 through a communication bus 18 to communicate with processor 13, namely interchange information with processor 13. For example, control circuit 14 receives information from processor 13, and further control battery charging circuit 11 and voltage regulating 12 accordingly; and control circuit 14 provides information regarding to circuit parameters of battery charging circuit 11 and circuit parameters of voltage regulating circuit 12 to processor 13, thus processor 13 is able to adjust its operating states in response to circuit parameters of battery charging circuit 11 and circuit parameters of voltage regulating circuit 12. As a result, demands for powering processor 13 at different operating states is easy to be met without increasing circuit volume and PCB size, and stability of the system is improved since unexpected shut down (e.g., over current, over voltage, under voltage or over temperature) is avoided.

In one embodiment, communication bus 18 is a serial voltage identification (SVID) bus. In other embodiments, communication bus 18 may be an inter integrated circuit (I2C) bus, a system management bus (SMBus), or a power management bus (PMBus). The circuit parameters of battery charging circuit 11 may comprise one or more of input voltage Vin, input current Iin, system voltage Vsys, system current Isys, battery voltage Vbat, charging current Ibat, temperature T1 of battery charging circuit 11, and temperature T2 of battery 15. The circuit parameters of voltage regulating circuit 12 may comprise one or more of processor voltage Vcore, processor current Icore, and temperature T3 of voltage regulating circuit 12. In one embodiment, one or both of voltage regulating circuit 12 and battery charging circuit 11 may be incorporated into control circuit 14. Voltage regulating circuit 12, battery charging circuit 11 and control circuit 14 together are called a voltage regulator (VR) incorporated with battery charging control.

Figure 2:
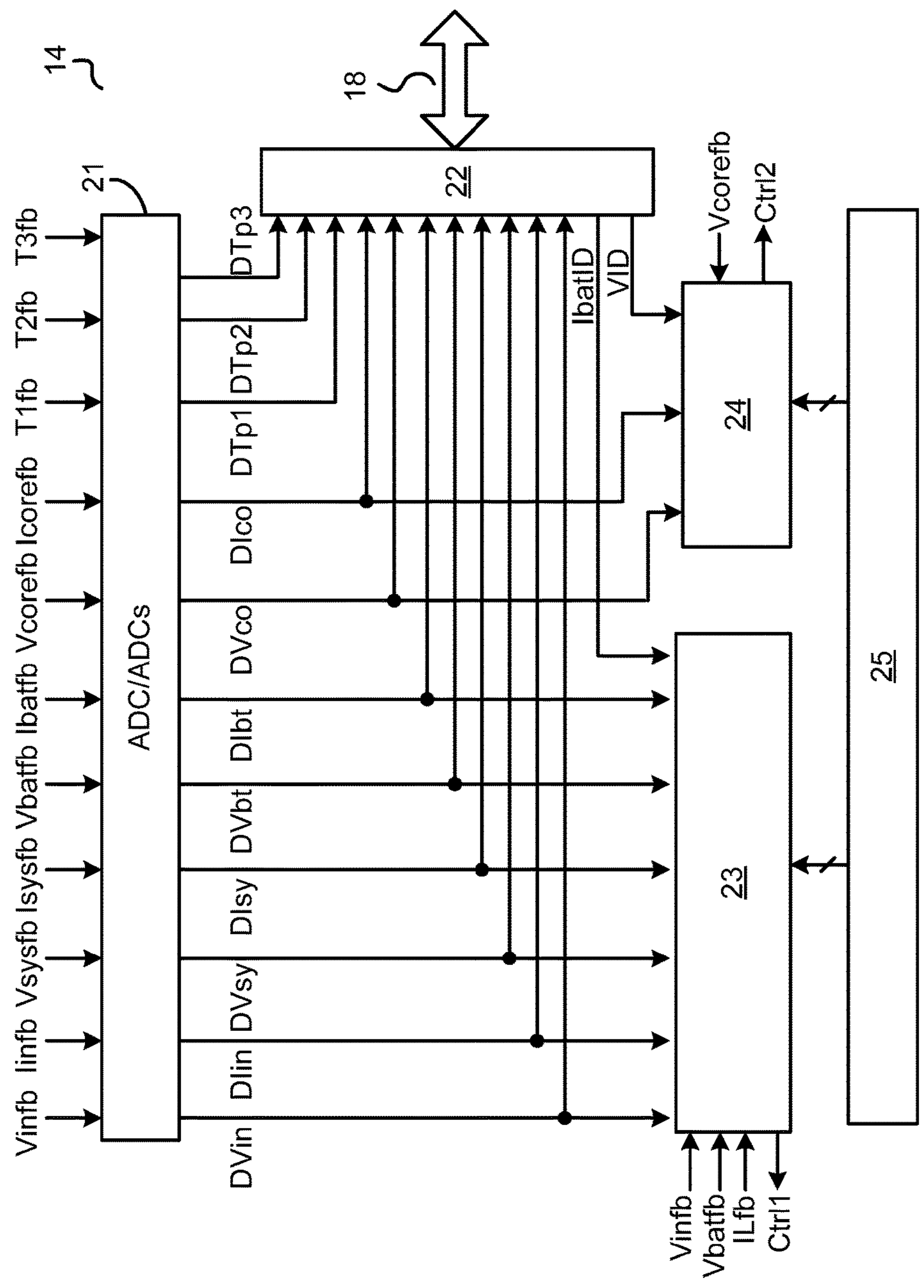
FIG. 2 schematically illustrates a control circuit 14 according to an embodiment of the present invention.

FIG. 2 schematically illustrates control circuit 14 according to an embodiment of the present invention. As FIG. 2 shown, control circuit 14 comprises an analog-to-digital converting unit 21, a communication interface 22, a charging control unit 23, a voltage regulating control unit 24, and a memory cell 25. In one embodiment, control circuit 14 is integrated on a single chip.

Analog-to-digital converting unit 21 receives the first plurality of feedback signals and provides a first plurality of digitalized feedback signals via analog to digital converting. For example, provides digitalized input voltage feedback signal DVin based on input voltage feedback signal Vinfb, provides digitalized input current feedback signal DIin based on input current feedback signal Iinfb, provides digitalized system voltage feedback signal DVsys based on system voltage feedback signal Vsysfb, provides digitalized system current feedback signal DIsys based on system current feedback signal Isysfb, provides digitalized battery voltage feedback signal DVbt based on battery voltage feedback signal Vbatfb, provides digitalized charging current feedback signal DIbt based on charging current feedback signal Ibatfb, provides digitalized temperature feedback signal DTp1 based on temperature feedback signal T1*fb*, and provides digitalized temperature feedback signal DTp2 based on temperature feedback signal T2*fb*. Analog-to-digital converting unit 21 further receives the second plurality of feedback signals and provides a second plurality of digitalized feedback signals via analog to digital converting. For example, provides digitalized processor voltage feedback signal DVco based on processor voltage feedback signal Vcorefb, provides digitalized processor current feedback signal DIco based on processor current feedback signal Icorefb, and provides digitalized temperature feedback signal DTp3 based on temperature feedback signal T3*fb*. One of ordinary skill in the art will appreciate that analog-to-digital converting unit 21 is not limited to receive and convert one or more of feedback signals mentioned above, analog-to-digital converting unit 21 may also receive other feedback signals and digitalize the other feedback signals accordingly.

Analog-to-digital converting unit 21 may comprise one or more analog-to-digital converters (ADCs). Each ADC may operate analog to digital converting on multiple analog signals using pipeline technology.

Communication interface 22 transmits the first plurality of digitalized feedback signals and the second plurality of digitalized feedback signals from analog-to digital converting unit 21 to processor 13 through communication bus 18, and receives information from processor 13 through communication bus 18. The Information received from processor 13 may comprise but not limited to, one or both of a voltage identification code VID which is used to set a reference voltage level for processor voltage Vcore, and a current identification code IbatID which is used to set a reference current level for charging current Ibat.

Memory cell 25 preserves a first plurality of data for initializing battery charging circuit 11 and a second plurality of data for initializing voltage regulating circuit 12. In one embodiment, charging control unit 23 loads the first plurality of data from memory cell 25, e.g., one or more of an initial frequency Fset1, a minimum off time period Minoff1, a first over temperature threshold and a first behavior of over temperature protection, a first over voltage threshold and a first behavior of over voltage protection, and a first over current threshold and a first behavior of over current protection. In one embodiment, voltage regulating control unit 24 loads the second plurality of data from memory cell 25, e.g., one or more of an initial frequency Fset2, a minimum off time period Minoff2, a second over temperature threshold and a second behavior of over temperature protection, a second over voltage threshold and a second behavior of over voltage protection, and a second over current threshold and a second behavior of over current protection. One of ordinary skill in the art will appreciate that data preserved by memory cell 25 is not limited to those mentioned above. In one embodiment, memory cell 25 is a non-volatile memory (NVM), an electrically erasable programmable read-only memory (EEPROM), a multi-time programmable (MTP) memory, or a flash.

Charging control unit 23 at least comprises part of hardware circuit, e.g., semiconductor circuit. In one embodiment, charging control unit 23 comprises both hardware circuit and software which is a set of machine readable instructions. Charging control unit 23 is coupled to analog-to-digital converting unit 21 to receive at least part of the first plurality of digitalized feedback signals (e.g., digitalized input voltage feedback signal DVin, digitalized input current feedback signal DIin, digitalized system voltage feedback signal DVsys, digitalized system current feedback signal DIsys, provides digitalized battery voltage feedback signal DVbt, provides digitalized charging current feedback signal DIbt), coupled to battery charging circuit 11 to receive at least part of the first plurality of feedback signals (e.g., input voltage feedback signal Vinfb, battery voltage feedback signal Vbatfb, and an inductor current feedback signal ILfb representative of a current IL flowing through battery charging circuit 11), and coupled to memory cell 25 to receive the first plurality of data for initializing battery charging circuit 11. Charging control unit 23 provides control signal Ctrl1 to control the at least one switch of battery charging circuit 11 based on at least part of the first plurality of digitalized feedback signals, at least part of the first plurality of feedback signals, and the first plurality of data for initializing battery charging circuit 11. In one embodiment, charging control unit 23 is further coupled to communication interface 22 to receive information from processor 13 regarding to one or more circuit parameters of battery charging circuit 11, and charging control unit 23 is configured to provide control signal Ctrl1 based on the information received from processor 13 and circuit parameters of battery charging circuit 11. For example, charging control circuit 23 receives current identification code IbatID from processor 13, and controls charging current Ibat equaling the reference current level set by current identification code IbatID.

Voltage regulating control unit 24 at least comprises part of hardware circuit, e.g., semiconductor circuit. In one embodiment, voltage regulating control unit 24 comprises both hardware circuit and software. Voltage regulating control unit 24 is coupled to analog-to-digital converting unit 21 to receive at least part of the second plurality of digitalized feedback signals (e.g., digitalized processor voltage feedback signal DVco, and digitalized processor current feedback signal DIco), coupled to voltage regulating circuit 12 to receive at least part of the second plurality of feedback signals (e.g., processor voltage feedback signal Vcorefb), and coupled to memory cell 25 to receive the second plurality of data for initializing voltage regulating circuit 12. Voltage regulating control unit 24 provides control signal Ctrl2 to control the at least one switch of voltage regulating circuit 12 based on at least part of the second plurality of digitalized feedback signals, at least part of the second plurality of feedback signals, and the second plurality of data for initializing voltage regulating circuit 12. In one embodiment, voltage regulating control unit 24 is further coupled to communication interface 22 to receive information from processor regarding to one or more circuit parameters of voltage regulating circuit 12, and voltage regulating control unit 24 is configured to provide control signal Ctrl2 based on information received from processor 13 and circuit parameters of voltage regulating circuit 12. For example, voltage regulating control unit 24 receives voltage identification code VID from processor 13, and controls processor voltage Vcore equaling the reference voltage level set by voltage identification code VID.

Figure 3:
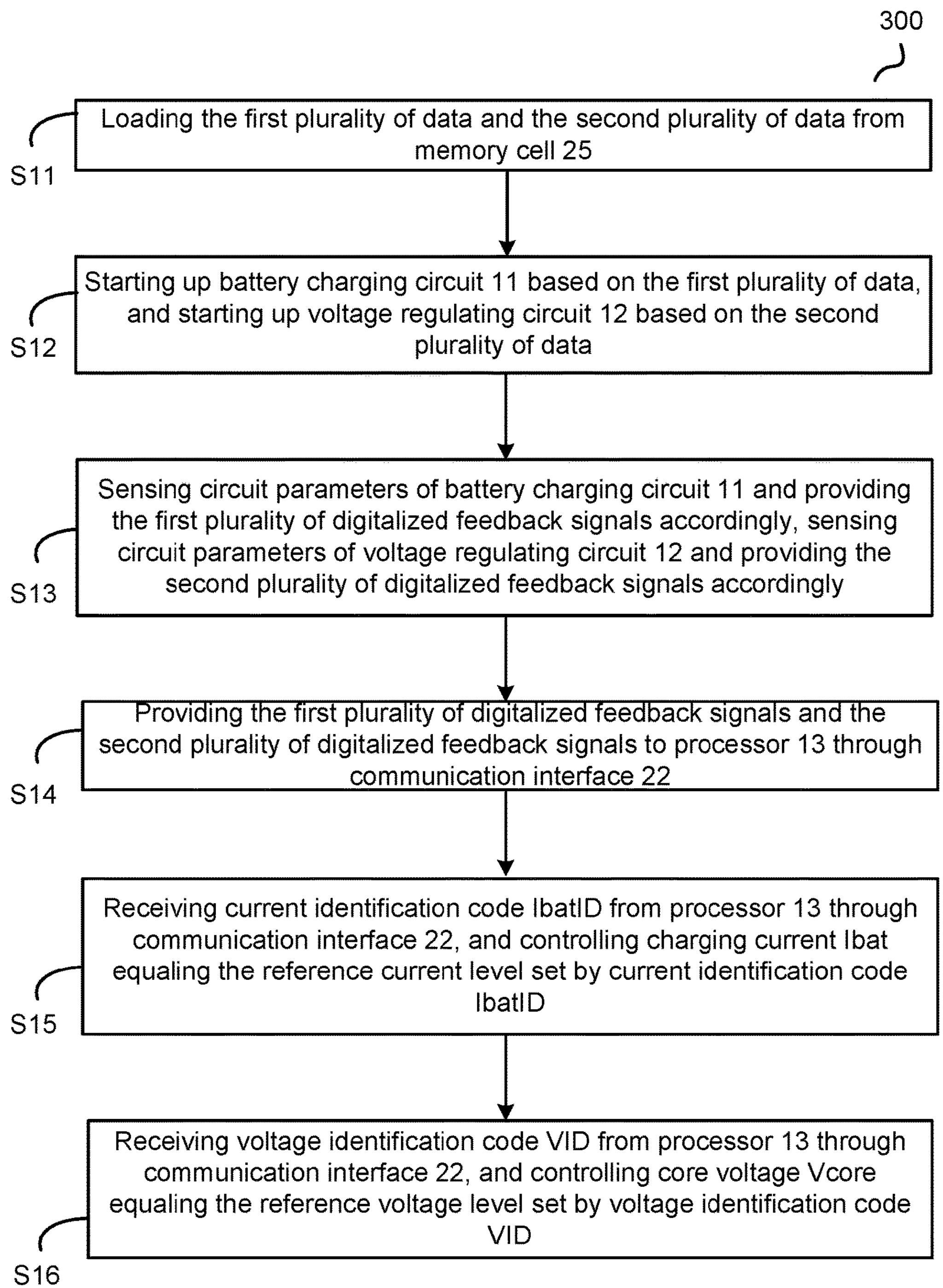
FIG. 3 shows a flow chart 300 of control circuit 14 as shown in FIG. 2 according to an embodiment of the present invention.

FIG. 3 shows a flow chart 300 of control circuit 14 as shown in FIG. 2 according to an embodiment of the present invention. Flow chart 300 comprises steps S11-S16.

At step S11, loading the first plurality of data and the second plurality of data from memory cell 25. In one embodiment, charging control unit 23 has a first register groups and voltage regulating control unit 24 has a second register groups, the first plurality of data is loaded to the first register groups and the second plurality of data is loaded to the second register groups.

At step S12, starting up battery charging circuit 11 based on the first plurality of data, and starting up voltage regulating circuit 12 based on the second plurality of data.

At step S13, sensing circuit parameters of battery charging circuit 11 and providing the first plurality of digitalized feedback signals accordingly, and sensing circuit parameters of voltage regulating circuit 12 and providing the second plurality of digitalized feedback signals accordingly.

At step S14, providing the first plurality of digitalized feedback signals and the second plurality of digitalized feedback signals to processor 13 through communication interface 22.

At step S15, receiving current identification code IbatID from processor 13 through communication interface 22, and controlling charging current Ibat equaling the reference current level set by current identification code IbatID.

At step S16, receiving voltage identification code VID from processor 13 through communication interface 22, and controlling processor voltage Vcore equaling the reference voltage level set by voltage identification code VID.

Note that in the flow chart 300 described above, the box functions may also be implemented with different order as shown in FIG. 3. Two successive box functions may be executed meanwhile, or sometimes the box functions may be executed in a reverse order. For example, step S16 may be executed before step S15, or at the same time with step S15.

Figure 4:
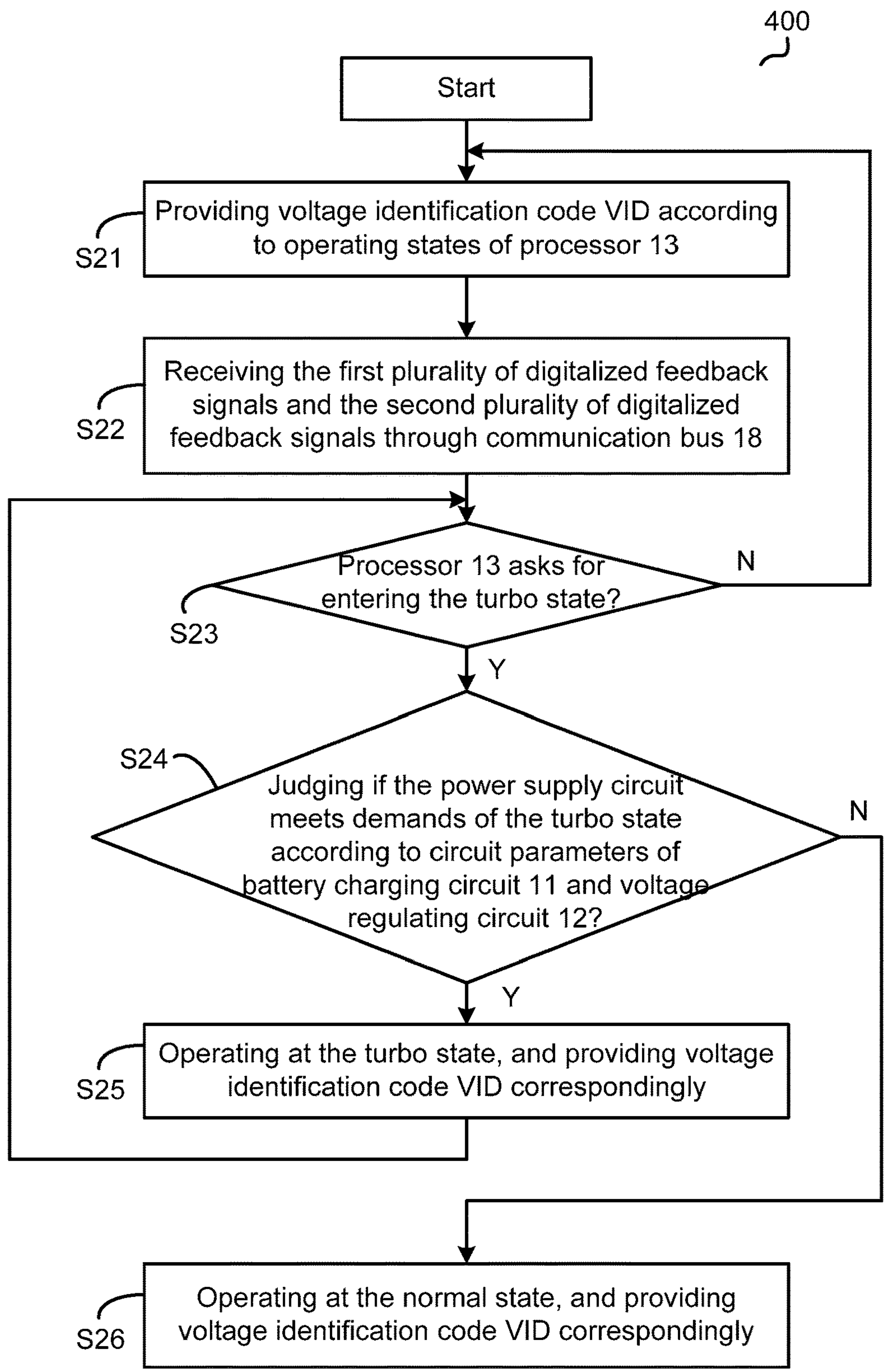
FIG. 4 shows a flow chart 400 of a processor 13 as shown in FIG. 1 according to an embodiment of the present invention.

FIG. 4 shows a flow chart 400 of processor 13 as shown in FIG. 1 according to an embodiment of the present invention. Flow chart 400 comprises steps S21-S26.

At step S21, providing voltage identification code VID according to the operating states of processor 13. The operating states of processor 13 may comprise a turbo state (i.e., high performance state), a normal state, an idle state, a sleep state, a deep sleep state, and a deeper sleep state.

At step S22, processor 13 receives the first plurality of digitalized feedback signals and the second plurality of digitalized feedback signals through communication bus 18.

At step S23, if processor 13 needs to boost its performance, e.g., if processor 13 asks for entering the turbo state, then go to step S24; otherwise go back to step S21. At step S24, judging if the power supply circuit meets demands of the turbo state according to circuit parameters of battery charging circuit 11 and voltage regulating circuit 12, e.g., based on the first plurality of digitalized feedback signals and the second plurality of digitalized feedback signals. In one embodiment, processor 13 judges that if battery charging circuit 11 is connected to the power source based on input voltage Vin, if not, then processor 13 concludes that the power supply circuit does not meet demands of the turbo state. In one embodiment, processor 13 judges if the power supply circuit meets power requirements of the turbo state based on system voltage Vsys and system current Isys. In one embodiment, processor 13 judges if the power supply circuit meets thermal dissipation requirements of the turbo state based on the temperature T1 of battery charging circuit 11, the temperature T2 of battery 15, and the temperature T3 of voltage regulating circuit 12.

If the power supply circuit cannot meet demands of the turbo state, then go to step S26, processor 13 operates at the normal state, and provides voltage identification code VID correspondingly.

If the power supply circuit meets demands of the turbo state, then go to step S25, processor 13 operates at the turbo state, and provides voltage identification code VID correspondingly. Then goes back to step S23 again and repeats the processes.

Note that in the flow chart 400 described above, the box functions may also be implemented with different order as shown in FIG. 4. Two successive box functions may be executed meanwhile, or sometimes the box functions may be executed in a reverse order. For example, step S22 may be executed before step S21, or at the same time with step S21.

Figure 5:
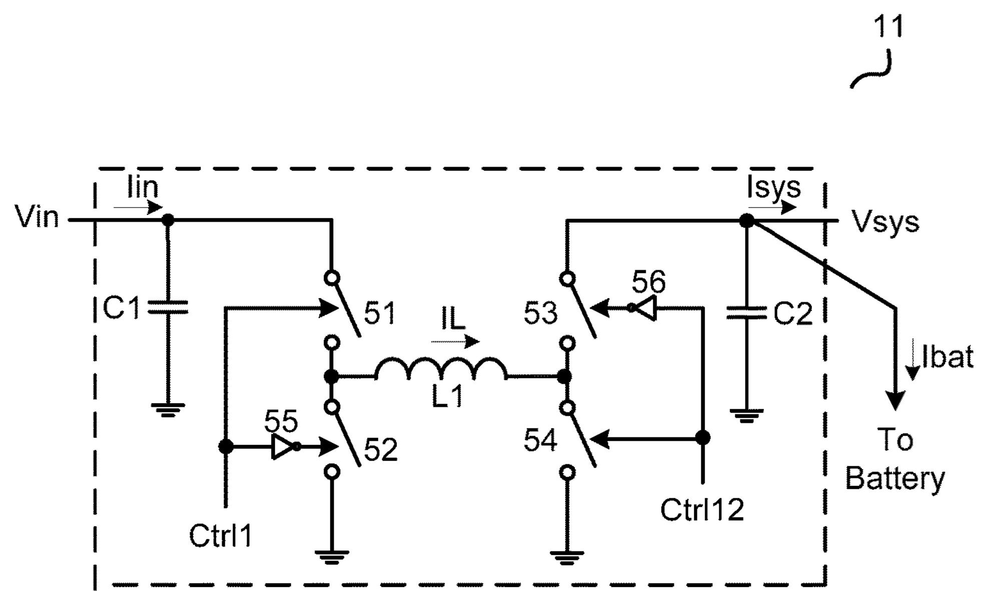
FIG. 5 schematically illustrates a battery charging circuit 11 as shown in FIG. 1 according to an embodiment of the present invention.

FIG. 5 schematically illustrates battery charging circuit 11 as shown in FIG. 1 according to an embodiment of the present invention. One of ordinary skill in the art will appreciate that specific circuit structure of battery charging circuit 11 is not limited as FIG. 5 shown, and other circuit topology also may be employed. In one embodiment, battery charging circuit 11 has an input terminal configured to receive input voltage Vin, and an output terminal configured to provide system voltage Vsys. Battery charging circuit 11 comprises a capacitor C1 coupled between the input terminal and a reference ground, a capacitor C2 coupled between the output terminal and the reference ground, switches 51-54, and an inductor L1. Switch 51 has a first terminal coupled to the input terminal of battery charging circuit 11, and a second terminal. Switch 52 has a first terminal coupled to the second terminal of switch 51, and a second terminal coupled to the reference ground. Switch 53 has a first terminal coupled to the output terminal of battery charging circuit 11, and a second terminal. Switch 54 has a first terminal coupled to the second terminal of switch 53, and a second terminal coupled to the reference ground. Inductor L1 has a first terminal coupled to the second terminal of switch 51 and the first terminal of switch 52, a second terminal coupled to the second terminal of switch 53 and the first terminal of switch 54. Current IL flows through inductor L1. Charging control unit 23 provides control signal Ctrl1 to control switch 51 and switch 52, provides control signal Ctrl12 to control switch 53 and switch 54. In one embodiment, switch 51 and switch 52 are turned ON complementary, and switch 53 and switch 54 are turned ON complementary.

Figure 6:
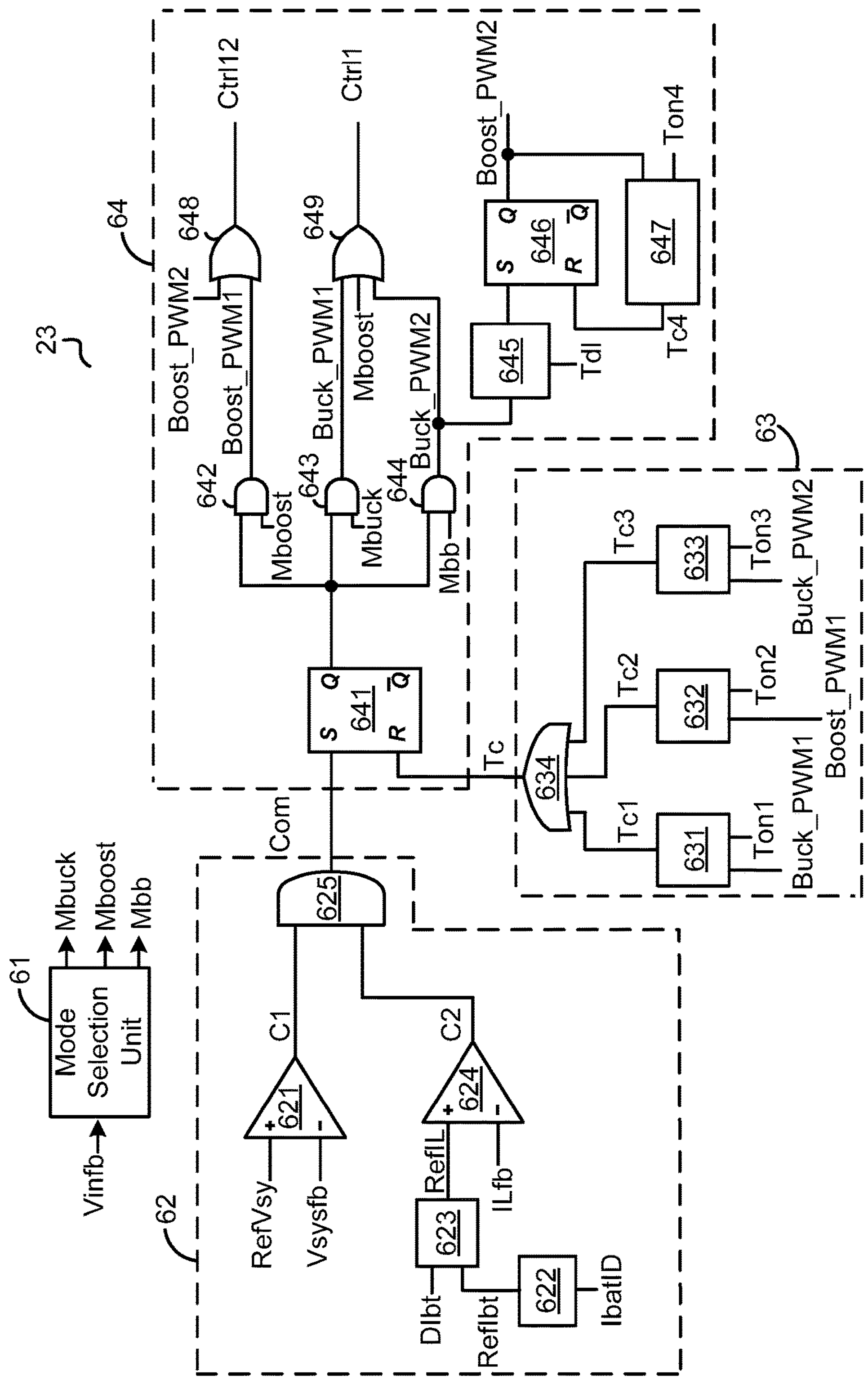
FIG. 6 schematically illustrates a charging control unit 23 as shown in FIG. 2 according to an embodiment of the present invention.

FIG. 6 schematically illustrates charging control unit 23 as shown in FIG. 2 according to an embodiment of the present invention. Charging control unit 23 provides control signal Ctrl1 to control switch 51 and switch 52 shown in FIG. 5, and provides control signal Ctrl2 to control switch 53 and switch 54 shown in FIG. 5. In the embodiment shown in FIG. 6, system voltage Vsys, charging current Ibat, and input current Iin are regulated. In one embodiment, charging control unit 23 comprises a mode selection unit 61, a loop control unit 62, an ON-time period control unit 63, and a switching control unit 64. One of ordinary skill in the art will appreciate that other circuits may also be employed in charging control unit 23 without detracting from the merits of the present invention.

Mode selection unit 61 determines working mode of battery charging circuit 11 based on input voltage Vin. In one embodiment, mode selection unit 61 receives input voltage feedback signal Vinfb, and provides mode signals Muck, Mboost and Mbb. In one embodiment, when input voltage feedback signal Vinfb is larger than or equals N1 times system voltage Vsys (Vinfb≥N1*Vsys), mode signal Mbuck is at a high voltage level, mode signal Mboost and mode signal Mbb are both at a low voltage level, battery charging circuit 11 works at a BUCK mode, control signal Ctrl1 is provided based on the first plurality of feedback signals to control switch 51 and switch 52 ON and OFF intermittently, and control signal Ctrl2 keeps at the low voltage level to maintain switch 53 ON and maintain switch 54 OFF. When input voltage feedback signal Vinfb is less than or equals N2 times system voltage Vsys (Vinfb≤N2*Vsys), mode signal Mboost is at the high voltage level, mode signal Mbuck and mode signal Mbb are both at low voltage level, battery charging circuit 11 works at a BOOST mode, control signal Ctrl2 is provided based on the first plurality of feedback signals to control switch 53 and switch 54 ON and OFF intermittently, and control signal Ctrl1 keeps at the high voltage level to maintain switch 51 ON and maintain switch 52 OFF. When input voltage feedback signal Vinfb is larger than N2 times system voltage Vsys, and is less than N1 times system voltage Vsys (N2*Vsys<Vinfb<N1*Vsys), mode signal Mbb is at the high voltage level, mode signal Mboost and mode signal Mbuck are both at the low voltage level, battery charging circuit 11 works at a BUCK-BOOST mode, control signal Ctrl1 is provided based on the first plurality of feedback signals to control switch 51 and switch 52 ON and OFF intermittently, and control signal Ctrl2 is provided to control switch 53 and switch 54 based on a preset ON time moment and a preset ON-time period Ton4. Where both N1 and N2 are positive numbers less than one, and N1 is larger than N2.

Loop control unit 62 comprises a system voltage control loop and a charging current control loop. In one embodiment, the system voltage control loop comprises a comparison circuit 621. Comparison circuit 621 provides a system voltage loop control signal C1 via comparing system voltage feedback signal Vsysfb with a system voltage reference signal RefVsy. In one embodiment, the charging current control loop comprises a reference current generating unit 622, a compensation unit 623, and a comparison circuit 624. Reference current generating unit 622 provides charging reference current RefIbt based on current identification code IbatID. Compensation unit 623 amplifies a difference between digitalized charging current feedback signal DIbt and charging reference current RefIbt, and provides reference inductive current RefIL via executing a compensation algorithm such as PID (Proportional Integral Differential). Comparison circuit 624 provides a charging current loop control signal C2 via comparing inductive current feedback signal ILfb with reference inductive current RefIL. A loop selection circuit 625 is employed to select one of the system voltage control loop and the charging current control loop taking effect. In one embodiment, loop selection circuit 625 provides a comparison signal Com based on system voltage loop control signal C1 and charging current loop control signal C2. In one embodiment, loop selection circuit 625 comprises an AND gate.

When battery charging circuit 11 works at the BUCK mode, ON-time period control unit 63 provides ON-time control signal Tc based on a preset ON-time period Ton1 to control an ON-time period of switch 51; when battery charging circuit 11 works at the BOOST mode, ON-time period control unit 63 provides ON-time control signal Tc based on a preset ON-time period Ton2 to control an ON-time period switch 54; and when battery charging circuit 11 works at the BUCK-BOOST mode, ON-time period control unit 63 provides ON-time control signal Tc based on a preset ON-time period Ton3. In one embodiment, ON-time period control unit 63 comprises timers 631-633 and an OR gate 634. Timer 631 starts timing at the moment a pulse signal Buck_PWM1 being at the high voltage level, timer 631 stops timing until preset time period Ton1 expired, and then ON-time control signal Tc1 transits at the high voltage level. Timer 632 starts timing at the moment a pulse signal Boost_PWM2 being at the high voltage level, timer 632 stops timing until preset time period Ton2 expired, and then ON-time control signal Tc2 transits at the high voltage level. Timer 633 starts timing at the moment a pulse signal Buck_PWM2 becomes high voltage level, timer 633 stops timing until preset time period Ton3 expired, and then ON-time control signal Tc3 transits at the high voltage level. OR gate 634 receives ON-time control signals Tc1-Tc3, and provides ON-time control signal Tc accordingly. When any of ON-time control signals Tc1-Tc3 transits at the high voltage level, ON-time control signal Tc transits at the high voltage level accordingly.

When battery charging circuit 11 works at the BUCK mode, control signal Ctrl12 keeps at the low voltage level to maintain switch 54 OFF and maintain switch 53 ON. Switch 51 is turned ON based on comparison signal Com, and switch 51 is turned OFF when the ON-time period of switch 51 equals preset time period Ton1. Switch 52 is controlled out of phase with switch 51. When battery charging circuit 11 works at the BOOST mode, control signal Ctrl1 keeps at the high voltage level to maintain switch 51 ON and maintain switch 52 OFF. Switch 54 is turned ON based on comparison signal Com, and switch 54 is turned OFF when the ON-time period of switch 54 equals preset time period Ton2. Switch 53 is controlled out of phase with switch 54. When battery charging circuit 11 works at the BUCK-BOOST mode, switch 51 is turned ON based on comparison signal Com, and switch 51 is turned OFF when the ON-time period of switch 51 equals preset ON-time period Ton1. Switch 52 is controlled out of phase with switch 51. Switch 54 is turned ON after a preset delay time period Tdl that switch 51 is ON, and switch 54 is turned OFF when the ON-time period of switch 54 equals preset time-period Ton4. Switch 53 is controlled out of phase with switch 54. In one embodiment, preset delay time period Tdl is half of a switching period of switch 51. In one embodiment, switching control unit 64 comprises a RS flip-flop 641, AND gates 642-644, a delay cell 645, a RS flip-flop 646, a timer 647, and OR gates 648-649. RS flip-flop 641 has a set terminal S configured to receive comparison signal Com, a reset terminal R configured to receive ON-time period control signal Tc, and an output terminal Q coupled to a first input terminal of AND gate 642, a first input terminal of AND gate 643, and a first input terminal of AND gate 644. A second input terminal of AND gate 642 receives mode signal Mboost, and an output terminal of AND gate 642 provides pulse signal Boost_PWM1. A second input terminal of AND gate 643 receives mode signal MBuck, and an output terminal of AND gate 643 provides pulse signal Buck_PWM1. A second input terminal of AND gate 644 receives mode signal Mbb, and an output terminal of AND gate 644 provides pulse signal Buck_PWM2. Delay cell 645 has an input terminal configured to receive pulse signal Buck_PWM2, and an output terminal coupled to a set terminal S of RS flip-flop 646. Delay cell 645 is configured to set RS flip-flop 646 after preset delay time period Tdl when pulse signal Buck_PWM2 becomes at the high voltage level. RS flip-flop 646 has a reset terminal R configured to receive an ON-time period control signal Tc4, and an output terminal Q configured to provide pulse signal Boost_PWM2. Timer 647 starts timing at the moment pulse signal Boost_PWM2 transits at the high voltage level, timer 647 stops timing until preset time period Ton4 expired, and then ON-time period control signal Tc4 becomes at the high voltage level to reset RS flip-flop circuit 646. OR gate 648 has a first input terminal configured to receive pulse signal Boost_PWM2, a second input terminal configured to receive pulse signal Boost_PWM1, and an output terminal configured to provide control signal Ctrl12. OR gate 649 has a first input terminal configured to receive pulse signal Buck_PWM1, a second input terminal configured to receive pulse signal Buck_PWM2, a third input terminal configured to receive mode signal Mboost, and an output terminal configured to provide control signal Ctrl1.

In one embodiment, preset time periods Ton1-Ton4 are obtained based on initial frequency Fset1 provided by memory cell 25.

Figure 7:
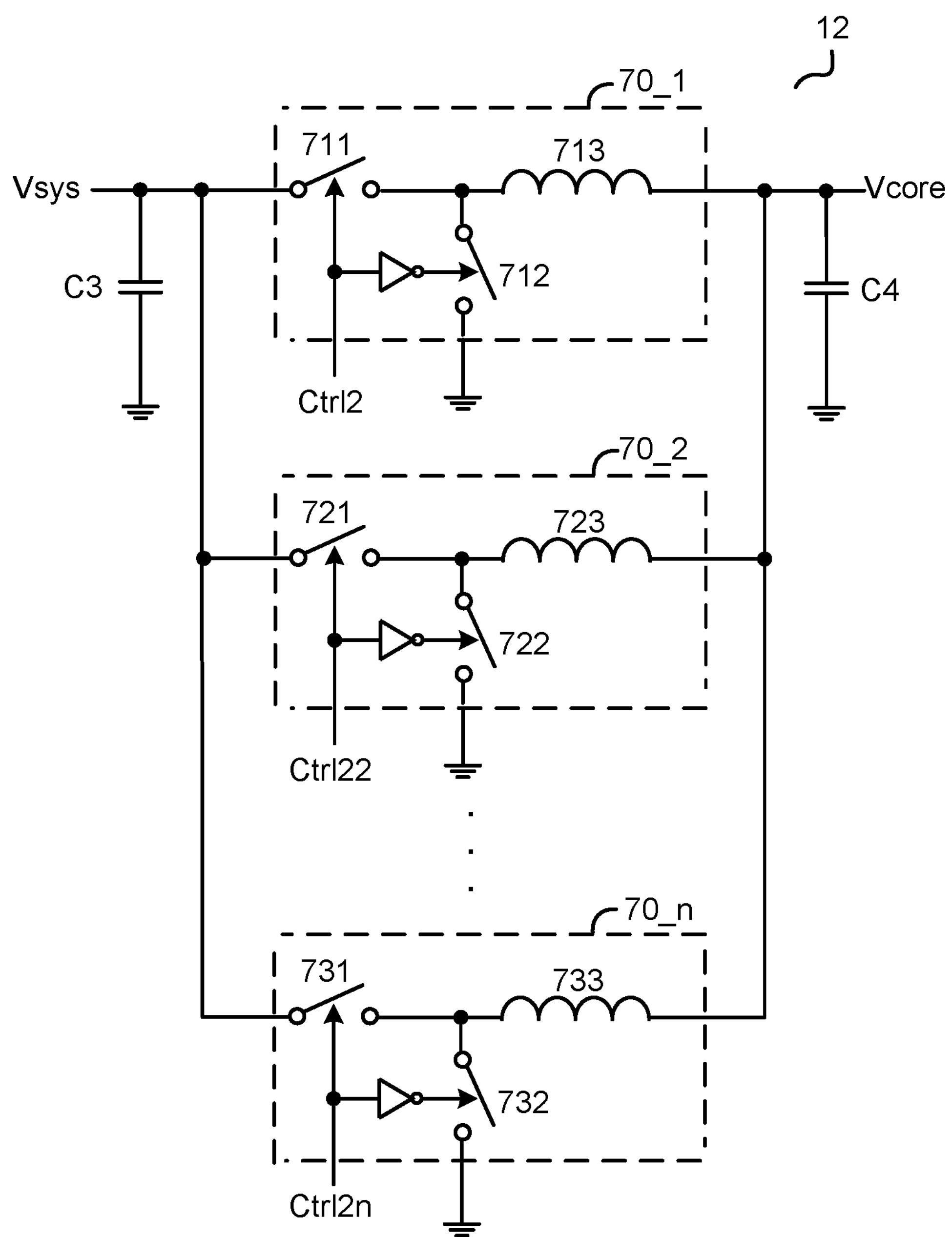
FIG. 7 schematically illustrates a voltage regulating circuit 12 as shown in FIG. 1 according to an embodiment of the present invention.

FIG. 7 schematically illustrates a voltage regulating circuit 12 as shown in FIG. 1 according to an embodiment of the present invention. One of ordinary skill in the art should appreciate that specific circuit structure of voltage regulating circuit 12 is not limited as FIG. 7 shown, and other circuits may also be employed without detracting from the merits of the present invention. In one embodiment, voltage regulating circuit 12 has an input terminal configured to receive system voltage Vsys, and an output terminal configured to provide processor voltage Vcore. A capacitor C3 is coupled between the input terminal of voltage regulating circuit 12 and the reference ground. A capacitor C4 is coupled between the output terminal of voltage regulating circuit 12 and the reference ground. A plurality of switching circuits 70_1-70_n are coupled in parallel between the input terminal and the output terminal of voltage regulating circuit 12, and each of switching circuits 70_1-70_n has at least one switch. In one embodiment, switching circuit 70_1 employs a step-down circuit topology comprising switches 711-712 and an inductor 713. Switching circuit 70_1 is turned ON and OFF by control signal Ctrl2. Switching circuit 70_2 employs a step-down circuit topology comprising switches 721-722 and an inductor 723. Switching circuit 70_2 is turned ON and OFF by a control signal Ctrl22. Switching circuit 70_n employs a step-down circuit topology comprising switches 731-732, and an inductor 733. Switching circuit 70_n is turned ON and OFF by a control signal Ctrl2n.

Figure 8:
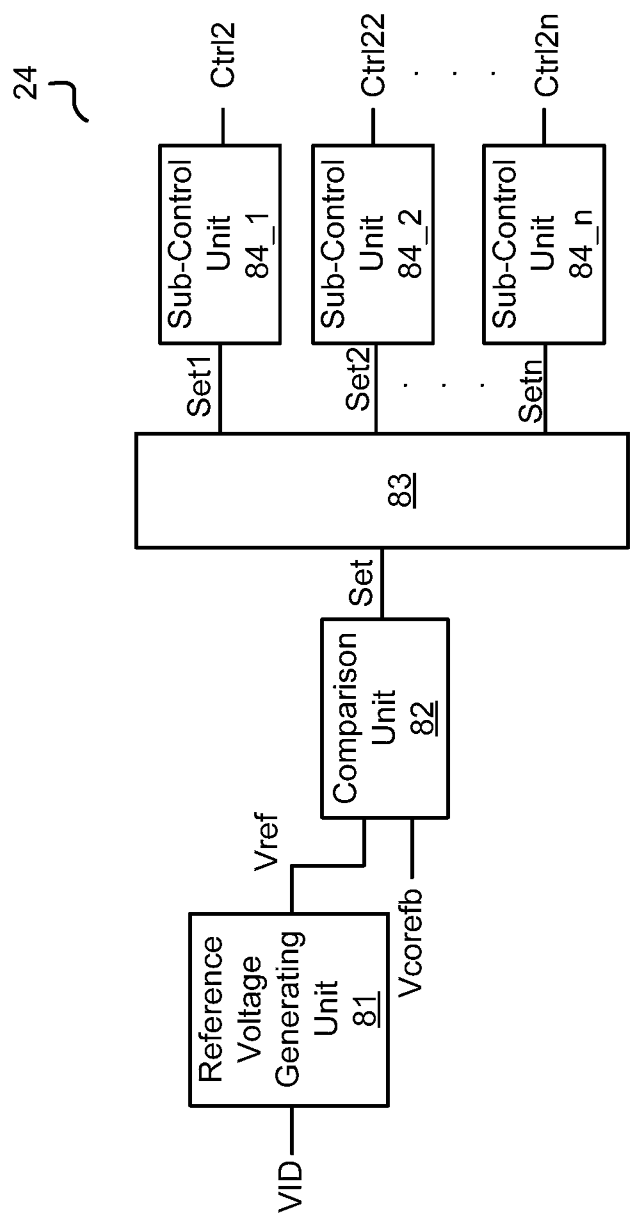
FIG. 8 schematically illustrates a voltage regulating control unit 24 as shown in FIG. 2 according to an embodiment of the present invention.

FIG. 8 schematically illustrates voltage regulating control unit 24 as shown in FIG. 2 according to an embodiment of the present invention. Voltage regulating control unit 24 provides a plurality of control signals Ctrl2, Ctrl22 . . . Ctrl2n to control the plurality of switching circuits 70_1-70_n shown in FIG. 7. In one embodiment, voltage regulating control unit 24 comprises a reference voltage generating unit 81, a comparison circuit 82, a multiplexer 83, a plurality of sub-control units 84_1-84_n. One of ordinary skill in the art will appreciate that specific circuit structure of voltage regulating control unit 24 is not limited as FIG. 8 shown. Reference voltage generating unit 81 provides reference voltage Vref based on voltage identification code VID sent by processor 13. Comparison circuit 82 provides comparison signal Set via comparing processor voltage feedback signal Vcorefb with reference voltage Vref. Multiplexer 83 receives comparison signal Set and provides set signals Set1-Setn via frequency dividing on comparison signal Set. For example, multiplexer 83 provides set signals Set1-Setn at the high voltage level successively if comparison signal Set is at the high voltage level, as a result, switching circuits 70_1-70_n are turned ON successively. Sub-control unit 84_1 provides control signal Ctrl2 based on set signal Set1 to control switching circuit 70_1, sub-control unit 84_2 provides control signal Ctrl22 based on set signal Set2 to control switching circuit 70_2, sub-control unit 84_n provides control signal Ctrl2n based on set signal Setn to control switching circuit 70_n. In one embodiment, sub-control units 84_1-84-n comprise an ON-time period control circuit.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A system, comprising:

a processor;

a battery charging circuit, having an input terminal configured to receive an input voltage from a power source and an output terminal coupled to a battery, wherein when the input terminal connects to the power source, the battery charging circuit is configured to provide a system voltage and a system current at the output terminal and provide a charging current to charge the battery;

a voltage regulating circuit, configured to receive the system voltage and provide a processor voltage to the processor; and a control circuit, configured to interchange information with the processor through a communication bus, the control circuit is further configured to provide a first control signal to control the battery charging circuit based on circuit parameters of the battery charging circuit and a first information received from the processor, and the control circuit is configured to provide a second control signal to control the voltage regulating circuit based on circuit parameters of the voltage regulating circuit and a second information received from the processor; wherein the control circuit is configured to provide digitalized feedback signals representative of the circuit parameters of the battery charging circuit and the circuit parameters of the voltage regulating circuit to the processor, and the processor is able to adjust its operating states in response to the digitalized feedback signals.

2. The system of claim 1, wherein the first information comprises a current identification code to set a reference current level for the charging current.

3. The system of claim 1, wherein the second information comprises a voltage identification code to set a reference voltage level for the processor voltage.

4. The system of claim 1, wherein the control circuit further comprises:

an analog-to-digital converting unit, configured to receive a first plurality of feedback signals of the battery charging circuit and a second plurality of feedback signals of the voltage regulating circuit, and configured to provide digitalized feedback signals via analog to digital converting;

a communication interface, configured to transmit the digitalized feedback signals from the analog-to-digital converting unit to the processor through the communication bus, and configured to receive the first information and the second information from the processor; and a memory cell, configured to preserve a first plurality of data for initializing the battery charging circuit and a second plurality of data for initializing the voltage regulating circuit.

5. The system of claim 1, wherein the operating states of the processor comprises at least a turbo state and a normal state, and before the processor enters the turbo state, the processor judges if the system meets demands of the turbo state based on the digitalized feedback signals.

6. The system of claim 1, wherein the digitalized feedback signals comprise one or more of a digitalized input voltage feedback signal representative of the input voltage, a digitalized system voltage feedback signal representative of the system voltage, a digitalized system current feedback signal representative of the system current, a first digitalized temperature feedback signal representative of a first temperature of the battery charging circuit, a second digitalized temperature feedback signal representative of a second temperature of the voltage regulating circuit, and a third digitalized temperature feedback signal representative of a third temperature of the battery.

7. The system of claim 4, wherein the control circuit further comprises:

a charging control unit, configured to provide the first control signal in response to the circuit parameters of the battery charging circuit, the first plurality of data, and the first information.

8. The system of claim 4, wherein the control circuit further comprises:

a voltage regulating control unit, configured to provide the second control signal in response to the circuit parameters of the voltage regulating circuit, the second plurality of data, and the second information.

9. A power supply circuit, comprising:

a battery charging circuit, having an input terminal configured to receive an input voltage from a power source, and an output terminal coupled to a battery, wherein when the input terminal connects to the power source, the battery charging circuit is configured to provide a system voltage and a system current at the output terminal and provide a charging current to charge the battery;

a voltage regulating circuit, coupled to the output terminal of the battery charging circuit to receive the system voltage, and configured to provide a processor voltage to a processor; and a control circuit, configured to provide a first control signal to control the battery charging circuit based on circuit parameters of the battery charging circuit, and provide a second control signal to control the voltage regulating circuit based on circuit parameters of the voltage regulating circuit, and the control circuit is configured to interchange information with the processor through a communication bus; wherein the control circuit is configured to provide digitalized feedback signals representative of the circuit parameters of the battery charging circuit and the circuit parameters of the voltage regulating circuit to the processor, and the processor is able to adjust its operating states accordingly.

10. The power supply circuit of claim 9, wherein the digitalized feedback signals comprises one or more of a digitalized input voltage feedback signal representative of the input voltage, a digitalized system voltage feedback signal representative of the system voltage, a digitalized system current feedback signal representative of the system current, a first digitalized temperature feedback signal representative of a first temperature of the battery charging circuit, a second digitalized temperature feedback signal representative of a second temperature of the voltage regulating circuit, and a third digitalized temperature feedback signal representative of a third temperature of the battery.

11. The power supply circuit of claim 9, wherein the control circuit further comprises:

an analog-to-digital converting unit, configured to receive a first plurality of feedback signals of the battery charging circuit and a second plurality of feedback signals of the voltage regulating circuit, and configured to provide the digitalized feedback signals based on the first plurality of feedback signals and the second plurality of feedback signals;

a communication interface, configured to transmit the digitalized feedback signals from the analog-to-digital converting unit to the processor through the communication bus, and configured to receive a first information and a second information from the processor;

a charging control unit, configured to provide the first control signal based on the first plurality of feedback signals and the first information; and a voltage regulating control unit, configured to provide the second control signal based on the second plurality of feedback signals and the second information.

12. The power supply circuit of claim 9, wherein one of the information the control circuit received from the processor comprises a current identification code, and the control circuit is configured to control the charging current varied with the current identification code.

13. The power supply circuit of claim 11, wherein the charging control unit is configured to adjust the charging current in response to the first information to accommodate the operating states of the processor.

14. The power supply circuit of claim 11, wherein the voltage regulating control unit is configured to adjust the processor voltage in response to the second information to accommodate the operating states of the processor.

15. A control method for a power supply circuit, the power supply circuit comprising a battery charging circuit having an input terminal configured to receive an input voltage, an output terminal configured to provide a system voltage and a system current, and a voltage regulating circuit configured to receive the system voltage and provide a processor voltage to a processor, wherein the battery charging circuit is further configured to charge a battery with a charging current, the control method comprising:

sensing circuit parameters of the battery charging circuit and circuit parameters of the voltage regulating circuit, and providing digitalized feedback signals accordingly via analog to digital converting;

sending the digitalized feedback signals to the processor, and the processor is able to adjust its operating states in response to the digitalized feedback signals;

receiving a plurality of information from the processor through a communication bus;

controlling the battery charging circuit in response to the circuit parameters of the battery charging circuit, and in response to at least part of the plurality of information received from the processor; and controlling the voltage regulating circuit in response to the circuit parameters of the voltage regulating circuit, and in response to at least part of the plurality of the information received from the processor.

16. The control method of claim 15, wherein the plurality of information received from the processor comprises a current identification code utilized to set a reference current level for the charging current and a voltage identification code utilized to set a reference voltage level for the processor voltage.

17. The control method of claim 15, wherein the digitalized feedback signals comprises one or more of a digitalized input voltage feedback signal representative of the input voltage, a digitalized system voltage feedback signal representative of the system voltage, a digitalized system current feedback signal representative of the system current, a first digitalized temperature feedback signal representative of a first temperature of the battery charging circuit, a second digitalized temperature feedback signal representative of a second temperature of the voltage regulating circuit, and a third digitalized temperature feedback signal representative of a third temperature of the battery.

18. The control method of claim 16, further comprising adjusting the charging current in response to the current identification code to accommodate the operating states of the processor.

19. The control method of claim 16, further comprising adjusting the processor voltage in response to the voltage identification code to accommodate the operating states of the processor.

* * * * *